Figure 1:
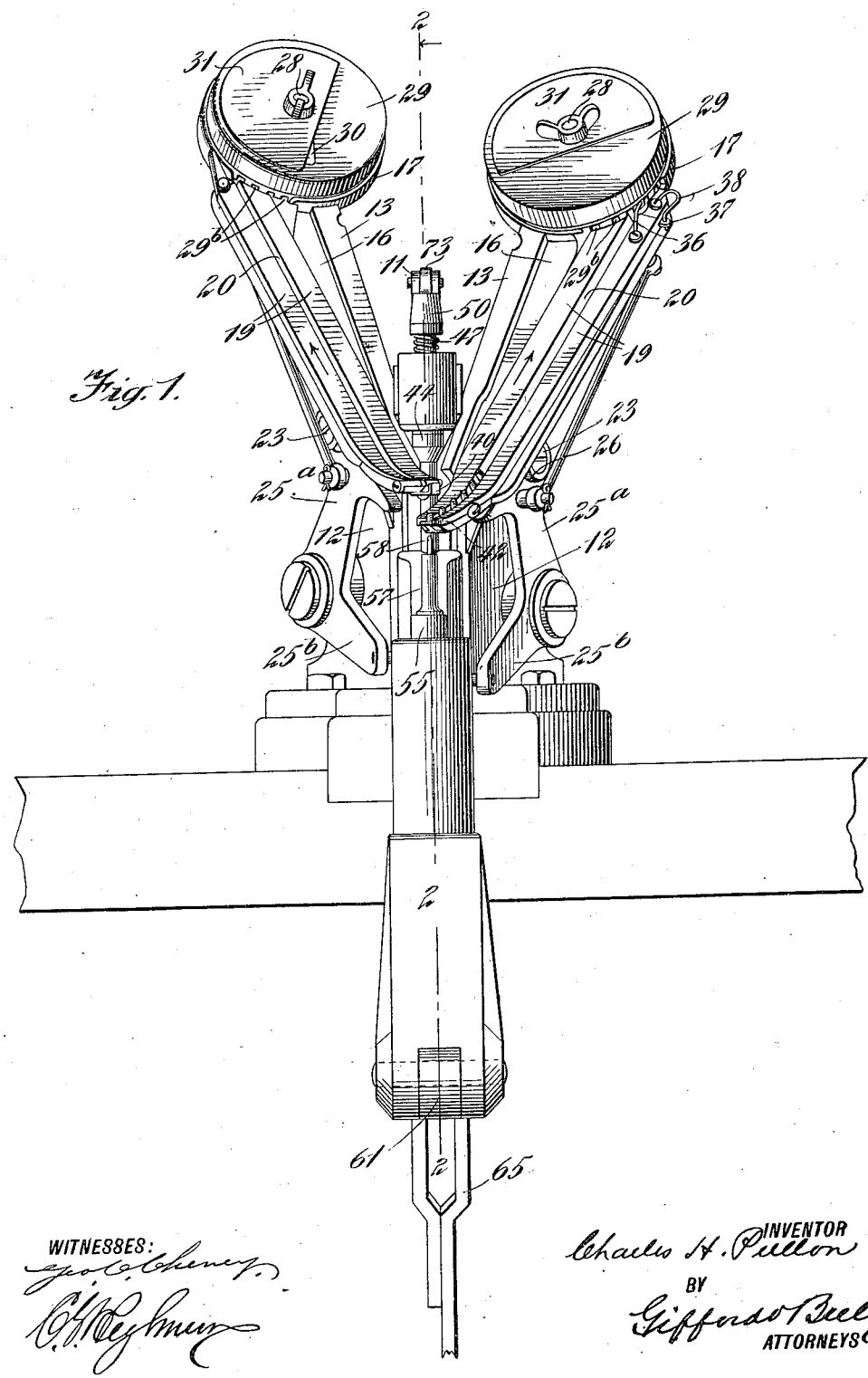

C. H. PULLON.
FASTENER ASSEMBLING AND ATTACHING MACHINE.
APPLICATION FILED NOV. 30, 1909.

1,069,724.

Patented Aug. 12, 1913.
6 SHEETS—SHEET 3.

C. H. PULLON.
FASTENER ASSEMBLING AND ATTACHING MACHINE.
APPLICATION FILED NOV. 30, 1909.
1,069,724.
Patented Aug. 12, 1913.
6 SHEETS—SHEET 4.
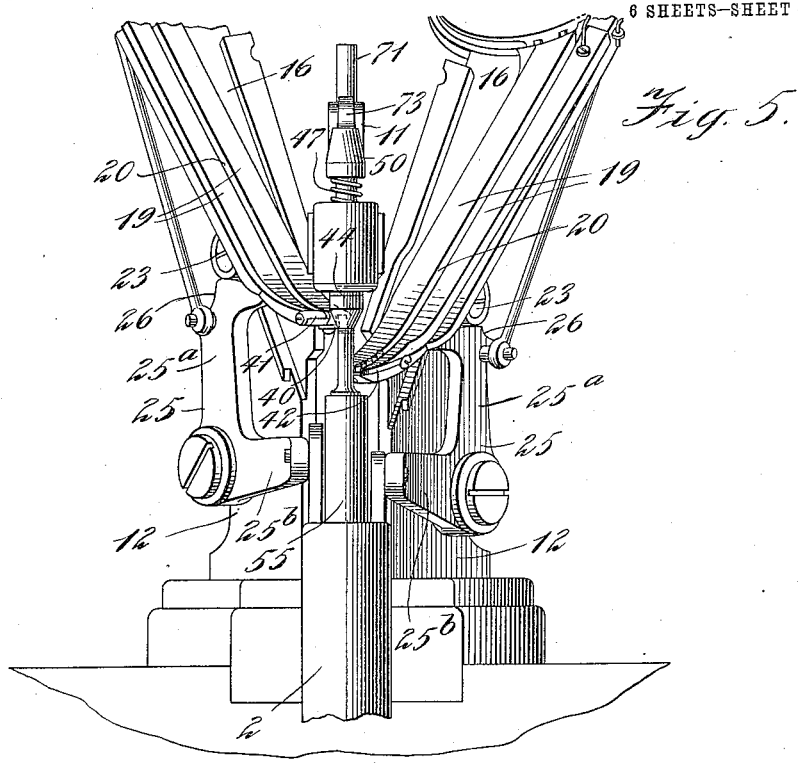
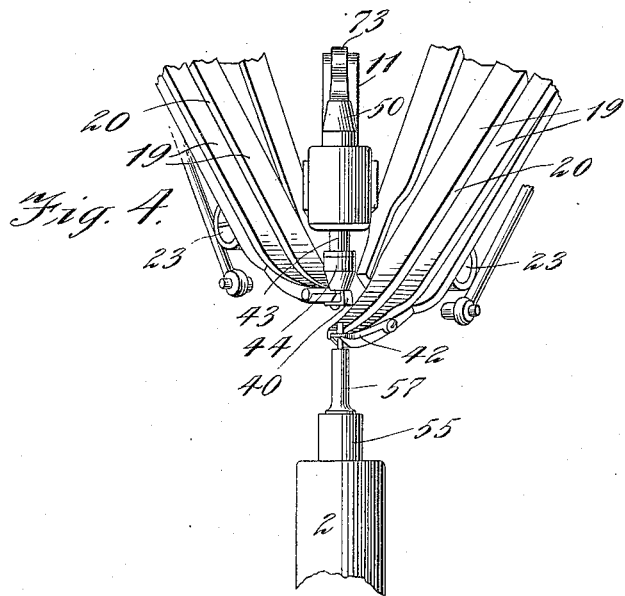

C. H. PULLON.
FASTENER ASSEMBLING AND ATTACHING MACHINE.
APPLICATION FILED NOV. 30, 1909.
1,069,724.
Patented Aug. 12, 1913.
6 SHEETS—SHEET 5.
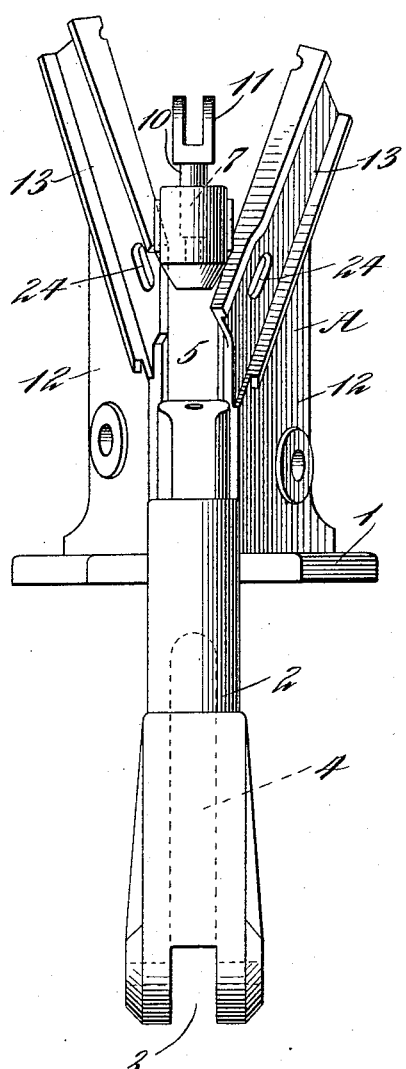
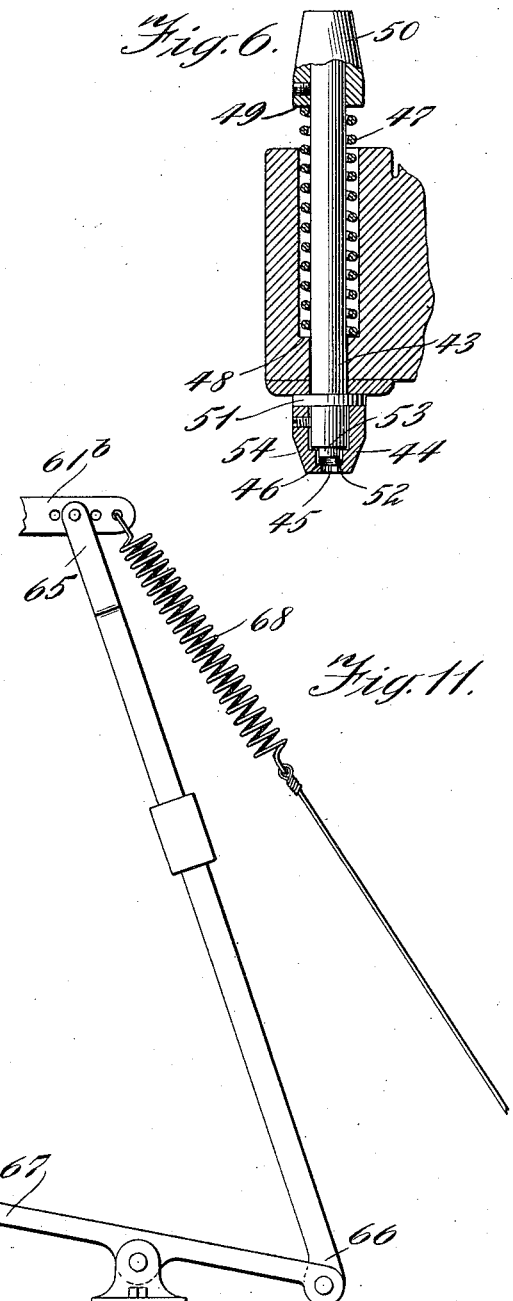
WITNESSES:
INVENTOR
Charles H. Pullon
BY
Gifford Bull
ATTORNEYS C. H. PULLON.
FASTENER ASSEMBLING AND ATTACHING MACHINE.
APPLICATION FILED NOV. 30, 1909.
1,069,724.
Patented Aug. 12, 1913.
6 SHEETS—SHEET 6.
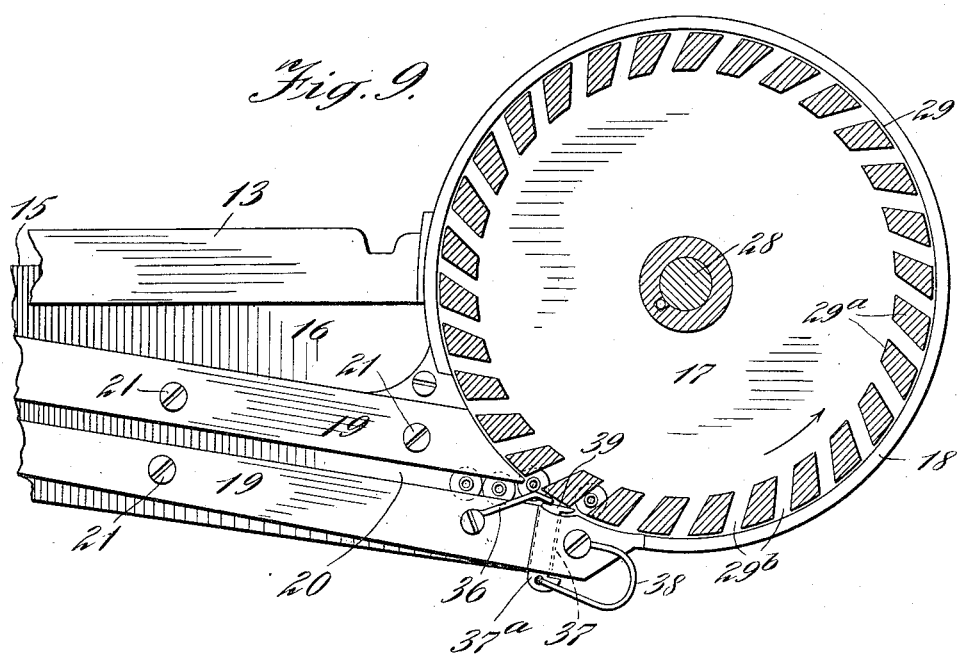
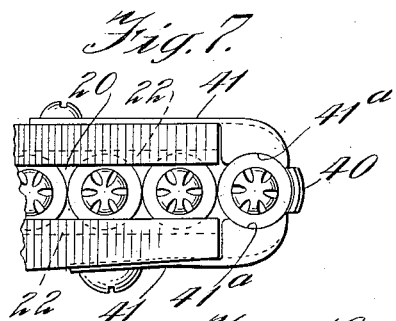
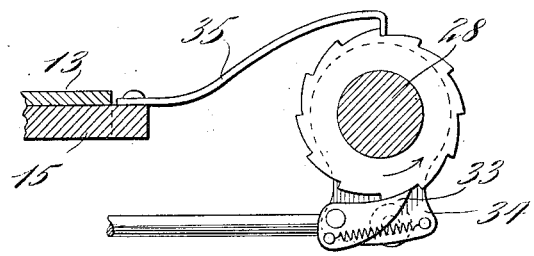
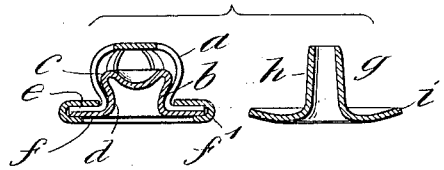
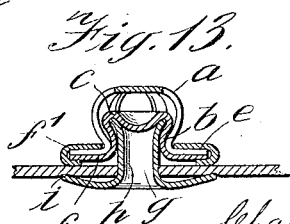
WITNESSES:
INVENTOR
Charles H. Pullon
BY
Gifford Bull
ATTORNEYS

UNITED STATES PATENT OFFICE.

CHARLES H. PULLON, OF WATERBURY, CONNECTICUT, ASSIGNOR TO LANE MANUFACTURING COMPANY, OF WATERBURY, CONNECTICUT, A CORPORATION OF CONNECTICUT.

FASTENER ASSEMBLING AND ATTACHING MACHINE.

1,069,724.     Specification of Letters Patent.     Patented Aug. 12, 1913.

Application filed November 30, 1909. Serial No. 530,596.

*To all whom it may concern:*

Be it known that I, CHARLES H. PULLON, a citizen of the United States, residing at Waterbury, in the county of New Haven and State of Connecticut, have invented certain new and useful Improvements in Fastener Assembling and Attaching Machines, of which the following is a specification.

My invention relates to new and useful improvements in machines for assembling parts of garment or other fasteners which comprise a plurality of parts which are brought together in a fixed relation to constitute the completed fastener or one of the members thereof.

The invention is particularly constructed to act upon that type of fastener known as "ball and socket," or "head and socket fasteners," and in the embodiment described and illustrated for the purposes of this application is designed to assemble the parts of the head or ball member into completed form and attach the same to a fabric or garment. One form of fastener upon which the invention is designed to operate comprises two parts which are brought together and the parts interlocked or clenched together to form a completed fastener member as will be fully described hereinafter. I wish it distinctly understood, however, that my invention is not to be limited to use with any specific type of fastener or fastener member as it may be employed for use in connection with a variety of fasteners. I also desire it understood that the machine may be employed either for the single function of assembling the fastener parts, or for performing the joint functions of assembling the fastener parts and attaching them to a garment or fabric.

The invention contemplates means for feeding the individual parts of the fastener into position to be assembled and means to which the parts are delivered by the feeding mechanism for assembling said parts into proper relation to constitute a completed fastener or fastener member.

I have fully and clearly illustrated my invention in the accompanying drawings to be taken as a part of this specification and wherein—

Figure 2:
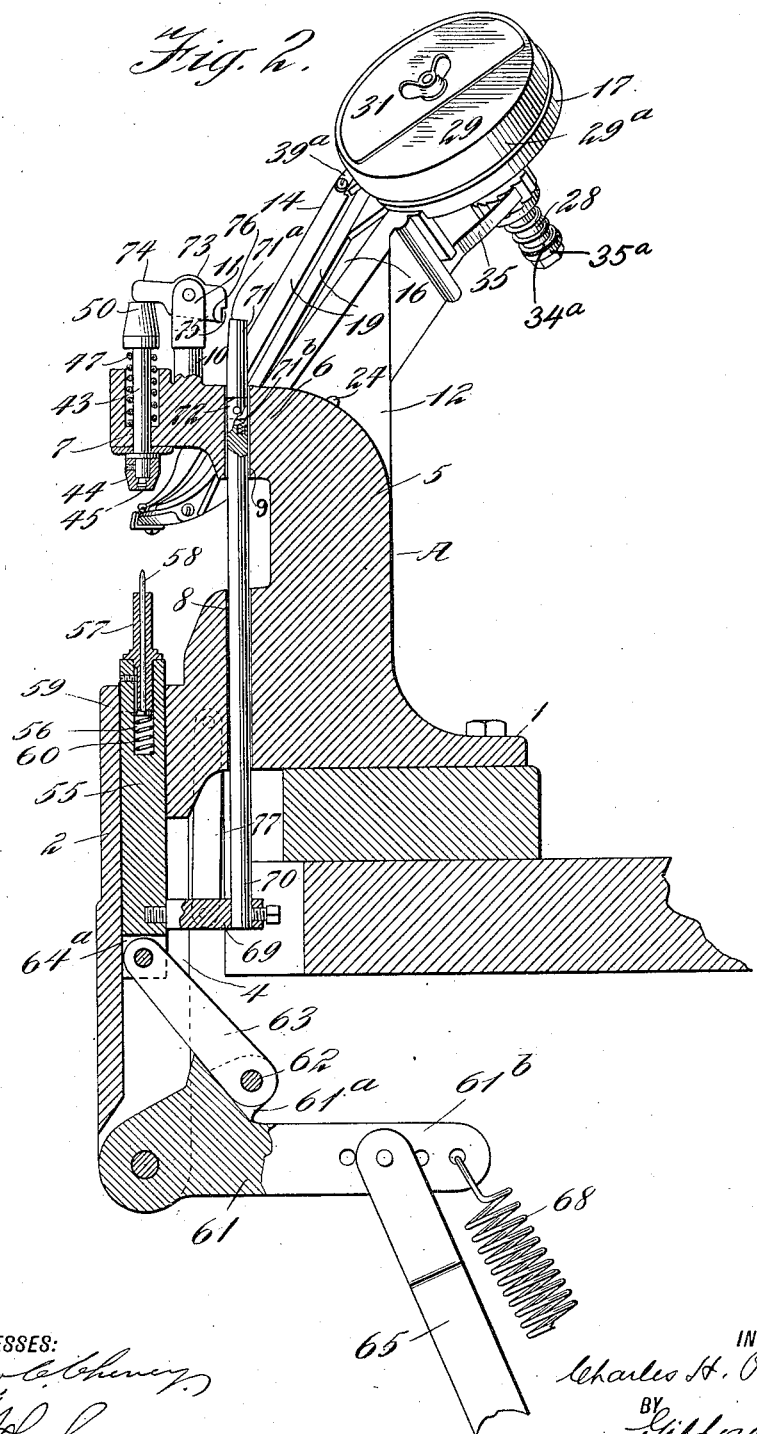
Figure 3:
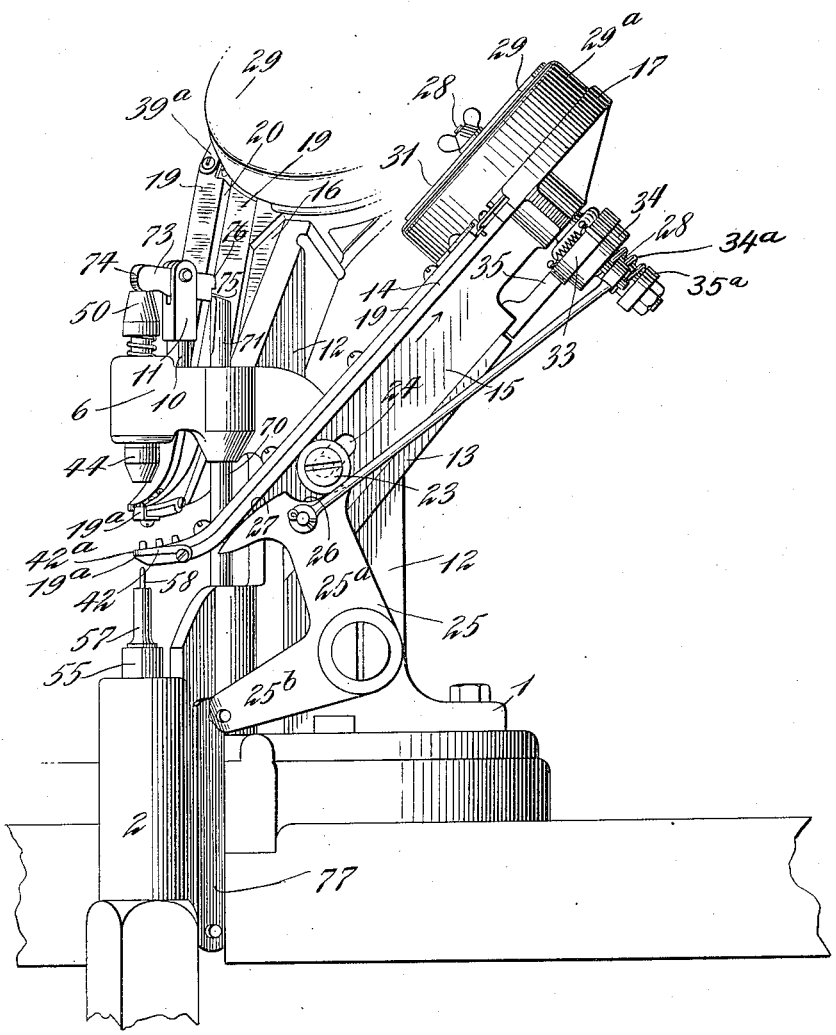

Figure 1 is a view in front elevation of the complete machine embodying my invention. Fig. 2 is a vertical central section taken on the line 2—2 of Fig. 1 illustrating the construction and relative arrangement of the assembling and attaching means. Fig. 3 is a side view looking at right-angles toward one of the feed mechanisms, the other feed mechanism and the assembling means being shown in perspective. Fig. 4 is a view in front elevation of the delivery ends of the feed mechanisms and the assembling elements in their relative positions when the fastener parts are delivered from the feed mechanisms to said elements. Fig. 5 is a similar view showing the feed mechanisms withdrawn from the path of the assembling elements, the latter being shown in the position at which the fastener elements are united. Fig. 6 is an enlarged detail sectional view of the anvil and pickup for holding one of the fastener parts during the assembling operation. Fig. 7 is an enlarged detail view of the delivery end of one of the feed mechanisms showing the means for holding the fastener parts prior to delivering the same to the assembling mechanism. Fig. 8 is a view of the frame of the machine with the several working parts removed. Fig. 9 is a detail view partly in section of a part of the feed mechanism and chute showing means for regulating a quantity of fastener parts to be delivered to the chute. Fig. 10 is a detail view of the pawl ratchet mechanism for operating the rotary receiver or container for the fastener parts. Fig. 11 is a detail view of the treadle operating mechanism for the machine. Fig. 12 illustrates separate sectional views of the two parts of which the fastener element is composed. Fig. 13 is a sectional view of a fastener with the parts assembled.

Before entering into a description of the machine embodying the invention, I will describe briefly one type of fastener or fastener element upon which it may operate. This fastener is shown in Figs. 12 and 13 of the drawings in the former of which are shown in section the parts before they are assembled, and in the latter after they are assembled and attached to a fabric. In these figures the fastener is shown as comprising a resilient head *a*, in which is inserted an anvil piece or socket *b*, having an anvil projection c, and a hollow neck d, said head and anvil socket having engaging flanges e, f, respectively, at their lower ends which are secured together by means of an annular collar f', all substantially as shown. g designates a shank or stem member consisting of a shank h and flange i, said shank being intended to pierce through a fabric and be passed within the hollow neck d, the head and stem member being clamped together by forcibly thrusting the end of the shank h into engagement with the anvil c which serves to spread and distend the metal of the shank h into substantially the position shown in Fig. 13. When the parts are united the fabric to which the fastener is attached is securely clamped between the flanged base of the head member and the flange of the shank member. As this fastener constitutes no part of my present invention and the construction thereof is well known in the art, the above description is deemed sufficient for the purposes of this application.

Referring now to Fig. 8 of the drawings, A designates the frame upon which the moving parts of the machine embodying my invention are assembled for coöperation. This frame consists of a base plate 1, adapted to be secured to any suitable foundation such as a work table, and preferably cast integral with the forepart of this base is a vertical hollow guide column 2, the lower end of which extends below the base and is bifurcated, as at 3, and at its rear is formed with a longitudinally extending slot 4. On the base, to the rear of the guide column 2, is a vertically extending pillar post 5 having an overhanging arm 6, the end of which projects over the column 2 and is formed with a vertical bore 7 in longitudinal alinement with the bore of said column 2. In the base 1 in rear of the said column is formed a guide bore 8 which alines with a bore 9, formed in said overhanging arm and registering with the bore 8. Mounted on the overhanging arm is a vertical post 10 having a bifurcated upper end 11.

Supported by the base and preferably made separate therefrom and bolted thereto, is a pair of posts 12, 12, set at angles to each other as shown, each of which is formed at its upper portion with a channel guideway 13, which is located preferably on the outer face of the post, said guideways being inclined downward from the upper rear portions of the posts toward the space between the overhanging arm 6, and the column 2. It will be noted that these guideways are located at different elevations, that is, the one shown to the left of the figure is higher than that to the right, for a purpose which will appear presently.

Slidably mounted in each guideway 13, is a reciprocating guide chute 14, consisting of an element 15 engaging the guideway and provided with a supporting plate 16 in a plane at right angles to said element, said plate 16 being arranged in an inclined plane substantially as shown, and formed at its upper end with a circular portion 17 constituting the bottom of a receiver or container for fastener parts, said circular portion having a circumferential flange 18 as shown. Mounted upon the upper face of the inclined supporting plate 16, is a pair of metallic strips 19, 19 spaced apart longitudinally to provide a guide channel 20, and secured in place by fastening screws 21, in such position that said channel runs tangentially to the circular portion 17 above described. The strips 19, 19 are spaced apart such a distance as to permit free and unobstructed passage of the shanks of the fastener parts, and are each undercut as at 22, to provide for the passage of the flanges of said parts, the parts being intended to move lengthwise of the chute but being held by the strips engaging said flanges to prevent removal by lateral movement. The lower ends of the strips 19, 19 forming the guide-channels and chutes, project between the overhanging arm and the column of the frame, at which point they are curved or formed, as at 19ª, 19ª to lie in substantially horizontal planes, the lower ends of the upper pair of strips 19, 19, when both pairs are in their lowermost position between said arm and column, being so located that the lower end of the guide-channel between the same is vertically over the lower end of the guide-channel between the lowermost pair of strips 19, 19, so that the socket and shank members of the fastener will be delivered from said channels in proper alinement to be assembled.

The feed chutes are slidably mounted in order that they may be withdrawn from their normal positions just described, so as not to interfere with the assembling elements to be fully described hereinafter. The movement of the chutes is limited in both directions by means of a pin or bolt 23, fixed to each of the sliding chute supports and extending through slots 24, 24 in the posts 12, 12, the said elements being normally in their lowermost positions as clearly shown in Fig. 1, dropping to those positions by gravity.

Any suitable means may be employed for sliding the feed chutes upward to carry the delivery ends thereof out of the positions above described, but I prefer to accomplish this by the following described mechanism: To each of the vertical posts 12 is fulcrumed a bell-crank lever 25, one arm 25ª of which is formed at its upper end with a cam shoulder 26 and a curved riding or holding face 27 arranged in juxtaposition to the under face of the supporting plate 16. The cam shoulder referred to is adapted to coöperate with the pin 23 above referred to, so that when the bell crank lever is thrown in the direction of the arrow in Figs. 1 and 3, the shoulder 26 strikes the pin 23 and lifts or slides the feed chute rearwardly and a continued movement of the bell crank lever in the same direction throws the riding surface into engagement with the pin to hold the guide chute in its raised position during the continued movement of the bell crank lever so as to hold the feed chute out of the path of movement of the assembling devices, to be hereinafter described, while the same are operating to assemble the fastener parts. The other arm 25$^b$ of the bell crank lever is connected to means to be presently described for operating said lever. The same operating means is employed for both feed chutes and the description just given applies with equal force to both of them.

Extending concentrically through each of the circular portions at the upper ends of the slidable supporting plates 16 is a rotary spindle 28 upon which is fixed a containing drum 29 having a flange 29$^a$ coöperating with the flange on the circular portion of the supporting plate to provide a receptacle for the fastener parts to be fed to the chute. The flange of this drum is formed with a plurality of tangential slots 29$^b$ of a width slightly greater than the neck of the shank portion or the head of the socket portion of the fastener parts. The flange of this drum and the slots therein are so arranged with reference to the inlet end of the guide channel in the chute that the fastener parts may pass therethrough, the flange being spaced from the circular portion of the spring plate to permit the flanges of the fastener to pass between the same and be delivered into the guide channel of the feed chute. The feed drum may be provided with a suitable aperture 30 and cover plate 31 for replenishing the supply of fastener parts within the drum. Means is provided for intermittently rotating the drums in order that the fastener parts therein will be shaken into proper position to pass through the tangential slots as above set forth, and any suitable means may be supplied for this purpose, but I prefer to project the spindle 28 through the under side of the supporting plate 16 and mount thereon a ratchet with which coöperates a pivoted spring-actuated pawl 33 mounted on a pawl carrier 34, pivoted on said spindle, said pawl carrier being urged into proper position to have the pawl coöperate with the ratchet by means of an expansion spring 34$^a$ on the spindle, said spring engaging the pawl-carrier and a shoulder 35$^a$ on the spindle. A leaf spring 35 may be provided to engage the ratchet teeth and prevent the reverse movement of the spindle. The drums for both feed mechanisms may be identically constructed and the same means employed for rotating the same in each case.

I have devised a novel and effective means for preventing the fastener parts being delivered to the chute faster, or in greater quantity, than they are delivered therefrom to the assembling means, the purpose being to prevent jamming and the consequent distortion of the fastener parts as they pass from the drum to the feed chute. In the feed chute to the right of Fig. 1, and as shown in detail in Fig. 9, I provide at the upper portion of the chute on the outer strip 19 of the chute, a spring 36, the free end of which projects over the guide channel 20 and terminates short of the inner edge of the inner strip 19 to provide a space to permit passage of the shank of a fastener part between said inner edge of the strip 19 and said free end of the spring, the spring constituting a resilient wall against which the fastener part abuts in passing to the chute. Extending through a guideway 37 formed in the wall of the guide channel, just above the spring portion referred to, is a sliding abutment piece 37$^a$, normally urged inward by means of a bow-spring 38, the foot 39, or inner end of the abutment piece, projecting a distance within the mouth of the guide chute. By this arrangement, should the guide chute be full of fastener parts, it will be impossible for any additional part to be admitted to the chute owing to the fact that as the same emerge from the slots in the drum the shanks or head portions of the fasteners will abut the free end of the spring 36, and their flanges will ride against the flange of the uppermost fastener properly within the chute and said abutment and will move in engagement with said spring and abutment without emerging entirely from the slot in the drum, so that said springs and spring abutment operate to throw the fastener part back into the drum through the slot from which it would ordinarily be fed. This operation takes place should the fastener part not emerge entirely from the slot, but should it emerge from the slot into the mouth of the chute, it will be forced out by the flange of the drum against the spring abutment and the free end of the spring 36 by the portion of the flange between the slot through which the fastener emerged and the next adjacent slot, and will be thrust back into the drum through said next adjacent slot. It will be understood that the foot of the abutment piece 37$^a$ either closely approaches or engages the periphery of the drum 17, being held there by the tension of the spring 38. Should the shank of the fastener pass the free end of the spring 36 so as to enter the space between the foot of said abutment piece and the periphery of the drum, the abutment piece will be pushed outwardly against the tension of its spring and will be held in this position until the drum rotates to bring one of the slots 29<sup>b</sup> opposite to the shank of the fastener, when the spring will be released to move the abutment piece in to push the fastener through the adjacent slot into the drum.

In the form shown in the drawings the feed mechanism to the right is shown as feeding the shank members of the fasteners, and the one to the left the socket or head members of the fastener, and in the last-mentioned feed mechanism, while the drum mechanism is substantially the same as that for the other feed mechanism, I prefer to employ a leaf spring 39<sup>a</sup> for guiding the fastener parts into the chute. However the regulating device might be used on either feed chute.

At the lower end of the uppermost feed chute is provided means for holding each fastener head as it reaches the position to be operated upon by the assembling means, and this holding means or device comprises a lip 40 at the end of the chute against which the fastener part abuts to limit its downward movement, and a pair of oppositely disposed spring jaws 41, 41 adjacent said lip and arranged with curved gripping faces 41<sup>a</sup> to grip the flange of the fastener element. The fastener parts are fed by gravity down the chutes and the lowermost fastener part is pushed down with sufficient force by those above it to be moved between the gripping faces 41<sup>a</sup> and the jaws 41. It will be seen that by this construction the fastener elements are not to be drawn out of the chute lengthwise of the latter, but are to be elevated from between the spring holding jaws. The delivery end of the lowermost feed mechanism is provided with a friction holding spring 42 having a curved end 42<sup>a</sup> to engage the flange of the fastener part to prevent unintentional removal thereof from the chute, but to permit removal thereof when the chute is moved rearwardly or upwardly, as hereinafter described.

I will now describe the means for receiving the several fastener elements from the feed mechanism and assembling the same, or assembling and attaching them to the fabric: This means comprises an anvil pickup member preferably carried by the overhanging arm of the frame. This anvil pickup member comprises a plunger rod 43 slidably disposed within the forward bore of the overhanging arm of the frame and carrying at its lower end an anvil head 44 having an aperture 45 at its lower end to receive a fastener member delivered from the uppermost feed chute, said anvil member having arranged within the said aperture a gripping spring 46 adapted to grip and hold the fastener element. This anvil is normally held elevated above the lower end of the uppermost feed chute by means of an expansive coiled spring 47 surrounding the plunger rod 43 and abutting a shoulder 48 within the overhanging arm and a shoulder 49 beneath the head 50 carried by the upper end of the plunger rod. The upward movement of the plunger rod is limited by means of a collar 51 arranged just above the anvil head to abut the overhanging arm when the plunger moves upward. The anvil head is preferably made detachable from the plunger rod and the gripping spring for the fasteners is carried, or rests upon, a shoulder 52 within the head, being held in position therein by means of the lower end 53 of the plunger rod which projects into the anvil, the latter being secured to the rod by means of a suitable set screw 54.

Slidably disposed within the hollow column 2 of the frame is a vertically reciprocating die or hammer-carrying plunger 55, formed at its upper end with a socket 56 in which is seated the base of the die or hammer 57. Extending through the longitudinal center of this die or hammer is a passage within which moves a pin 58, the upper end of which normally projects for a distance beyond the striking face of the hammer or die. At its inner end this pin is provided with a head 59 against which abuts one end of an expansive coiled spring 60, the other end of which is seated against the base of the socket in the hammer-carrying member, said spring serving to normally thrust the spring into the position shown in Figs. 1, 2, 3 and 4 of the drawings, and as a cushion for the pin, as will be presently set forth. The pin 58 just referred to is arranged so as to normally extend vertically in longitudinal alinement with the opening through the lowermost fastener element at the end of the under feed chute, so that upon raising the hammer element said pin will pass through the bore of the fastener element, the latter being left upon the pin when the feed chute is withdrawn. Means is provided for first moving the anvil and hammer elements in position, so that the former will pick up a socket member from the upper feed chute and the hammer will pick up a shank member from the lower feed chute, to withdraw the feed mechanism from between the anvil and die and then bring the anvil and die into coöperation to unite the fastener parts. This means will now be described: Fulcrumed in the bifurcated lower end of the column 2 is the bell crank lever 61 to one arm 61<sup>a</sup> of which is pivotally connected as at 62, one end of a connecting link 63, the other end of which extends within a slot 64<sup>a</sup> formed within the lower end of the hammer carrier, said link being pivotally connected to the latter. To the free end of the other arm 61<sup>b</sup> of the bell crank lever is pivotally connected one end of a connecting rod 65, the other end 66 of which is pivoted to the rear end of an intermediately fulcrumed foot lever 67. It will, therefore, be seen that whenever the foot lever is depressed the connecting rod 65 will be moved upwardly and the motion thereof transmitted through the bell crank lever to the hammer carrier to move the latter upward. The hammer carrier is returned to its lower position by means of a contractile spring 68, one end of which is connected to the free end of the arm of the bell crank lever to which the connecting rod 65 is secured, and the other end of which spring is secured to any suitable fixed support.

Projecting rearward from the hammer carrier is an arm or stud 69 to which is rigidly connected a vertically extending thrust rod 70, which projects upward through the guide passage in the frame casting located to the rear of the column guide and the overhanging arm. This rod is provided at its upper end with a movable portion 71 having at its upper end the shoulder 71$^a$, said movable section being connected to the main portion of the rod by a hinged joint 72, an expansive coiled spring 71$^b$ operating to force the movable section forwardly on its pivot toward the reciprocating anvil. Pivotally mounted within the bifurcated end 11 of the post 10 is an intermediately fulcrumed lever 73, one end 74, of which engages upon the head 50 carried by the upper end of the plunger rod, the opposite end of said lever being formed with a shoulder or projecting lip 75, and an engaging face 76. When the hammer carrier is in its lower position, the movable section 71 assumes a position in alinement with the rod 70 with its shoulder 71$^a$, beneath and out of engagement with the lip 75 above referred to and its vertical face closely adjacent but not in engagement with the face 76. When the hammer carrier is raised this rod 70 is likewise moved upward and the pivoted section 71 of the thrust rod is thrown over by the spring 71$^b$ into engagement with the lip 75 to raise the rear end of the lever, whereby the forward end of said lever is depressed and the anvil bar moved down to place the anvil in position to pick up a fastener element. At about the time the anvil pickup engages the fastener element the engaging face 76 on the rear end of the lever 73 moves in position to throw the pivoted end 71 of the thrust rod out of engagement with said lip, so that the spring 47 can return the anvil to its normal position, the pivoted section of the thrust rod moving past the lever as shown in Fig. 5. At the same time that the hammer carrier is moved upward the bell crank levers for operating the feed chutes are moved in a proper direction to raise said chutes by means of the connecting links 77 connected to the lower ends of said bell crank levers and the stud 69 projecting from the rear of the hammer carrier.

The parts being as above described, the operation of the machine embodying my invention is as follows: The feed drums are each filled with a quantity of the proper fastening elements desired to be fed to the assembling means by each feed mechanism, and a sufficient quantity of the elements are permitted to enter and rest within the feed chutes, so that there is a fastener element of each kind necessary to make up the fastener or fastener member, in position to be engaged by the assembling means. The operator then depresses the foot lever, which serves at first to lift the hammer carrier in position to receive one of the shank members upon the pin carried by the die or hammer, and through the medium of the thrust rod 70 to depress the anvil to pick up one of the socket or head members. Upon further depressing the foot lever the die or hammer element is given a further vertical movement and likewise the thrust rod, the upper end of the latter moving out of engagement with the anvil-depressing lever and permitting the spring 47 to return the anvil to its normal or upper position. The downward motion of the foot lever is then continued and through the medium of the connecting links 77 the bell crank levers 25 are thrown upward and rearward, the cam shoulders thereon moving into engagement with the pins on the feed chute supporting plates to thrust the feed chutes upward to carry their lower ends out of the path of movement of the hammer or die element. The assembling elements and feed mechanisms will be in such positions that said assembling elements will be separated a distance from each other, and the lower ends of the feed chutes will be withdrawn from the path of movement of said assembling elements.

It is usual in applying these fasteners to fabrics or garments, for instance, such as gloves, to previously perforate the fabric at the point or points where the fasteners are to be applied. The article thus perforated is then manipulated so as to have a pin-carrying fastener element project through one of said perforations and in this position the article is ready to have the fastener part applied thereto. The further depression of the foot lever raises the die element into position to force the shank of the shank member into the socket of the head member of the fastener and securely clench the same together, the shank-carrying pin having a cushion movement within the hammer carrier to prevent the same punching through the head part of the fastener. Upon releasing the foot lever it is returned to its normal position by the spring 68, the hammer carrier and thrust bar are drawn down to their normal position and the bell crank levers for raising the feed chutes likewise assume their normal positions, the feed chutes gravitating into position to again present the fastener elements to the assembling means. Upon the return movement of the feed mechanisms the lip provided at the delivery end of the upper feed chute will operate to strike the assembled fastener from the anvil pickup should said fastener not be previously removed therefrom by the operator.

During the first movement of depression of the foot lever the bell crank levers for the feed chutes are necessarily thrown back, but the cam shoulders carried thereby are so positioned with relation to the pins on the feed chutes that there is a period of lost motion between the same. In other words, the cam shoulders do not operate to lift the chutes until it has been assured that the fastener parts have been properly engaged and received by the assembling elements. The lifting of the feed chutes is completed before the complete assemblage of the fastener elements and they are held in that position by the holding surfaces heretofore referred to, carried by the ends of the bell crank levers. It is obvious that in the rearward throw of the bell crank levers the pawls and ratchets will be operated for rotating the spindles carrying the supply drums for the feed mechanisms.

While I have stated above that it is usual to have the article to which the fastener is to be applied perforated for the reception of the shank of the fastener, I desire it to be understood that it is not always necessary as the pin 58 constitutes an efficient punch for providing the necessary perforation to receive the fastener.

Having thus described my invention, what I claim as new and desire to secure by Letters Patent is:—

1. In a mechanism for attaching fasteners composed of a plurality of parts, a plurality of mechanisms for feeding the individual parts of a fastener, each mechanism including a sliding element having a raceway for a part of the fastener, said elements being arranged to deliver the parts at different points but in line with each other, coöperating assembling elements movable toward each other and between which the parts of the fastener are delivered, and means for moving the assembling elements into coöperation and withdrawing the sliding feed elements from between the same.

2. In a machine for attaching fasteners composed of a plurality of parts, a plurality of feed mechanisms for feeding the individual parts of a fastener and arranged to deliver the same at different points one above the other, but in line with each other, vertically reciprocating assembling elements between which the delivery ends of the feed mechanisms project, and means for operating the assembling elements to receive the parts from the feed mechanisms, and for simultaneously withdrawing the projecting delivery ends of the feed mechanisms from the path of movement of the assembling elements.

3. In a machine for attaching fasteners composed of a plurality of parts, a plurality of feed mechanisms each adapted to feed an individual part of a fastener, an anvil to receive a part from one of the feed mechanisms, means for moving the anvil into coöperation with one of the feed mechanisms to receive a fastener part and for withdrawing said anvil therefrom, a plunger to receive a fastener part from another of the feed mechanisms, and means for moving the plunger into coöperation with the anvil to assemble the parts.

4. In a machine for attaching fasteners composed of a plurality of parts, a plurality of feed mechanisms each adapted to feed an individual part of a fastener, an anvil to receive a part from one of the feed mechanisms, means for moving the anvil into coöperation with one of the feed mechanisms to receive a fastener part and withdraw the same therefrom, a spring to retract the anvil from the feed mechanism, a plunger to receive a fastener part from another feed mechanism, and means for moving the plunger into coöperation with the anvil to assemble the fastener parts.

5. In a machine for attaching fasteners composed of a plurality of parts, a plurality of feed mechanisms each adapted to feed an individual part of a fastener, an anvil to receive a part from one of the feed mechanisms, a trip mechanism for moving the anvil into coöperation with one of the feed mechanisms to receive a fastener part therefrom, a spring to retract the anvil from the feed mechanism, a plunger to receive a fastener part from another feed mechanism, and means for moving the plunger into coöperation with the anvil to assemble the parts of the fastener.

6. In a machine for attaching fasteners composed of a plurality of parts, a plurality of feed mechanisms each adapted to feed an individual part of a fastener, an anvil to receive a part from one of the feed mechanisms, means for moving the anvil into coöperation with one of the feed mechanisms to receive a fastener part and withdraw the fastener part therefrom, means to retract the anvil from the feed mechanism, a plunger to receive a fastener part from another feed mechanism, and means for moving the plunger into coöperation with the anvil to assemble the fastener parts.

7. In a machine for attaching fasteners composed of a plurality of parts, a plurality of feed mechanisms each adapted to feed an individual part of a fastener, an anvil to receive a part from one of the feed mechanisms, a trip mechanism for moving the anvil into coöperation with one of the feed mechanisms to receive a fastener part therefrom, means to retract the anvil from the feed mechanism, a plunger to receive a fastener part from another feed mechanism, and means for moving the plunger into coöperation with the anvil to assemble the parts of the fastener.

8. In a machine for attaching fasteners composed of a plurality of parts, a plurality of feed mechanisms each adapted to feed an individual part of a fastener, an anvil to receive a part from one of the feed mechanisms, a trip mechanism for moving the anvil into coöperation with one of the feed mechanisms, said trip mechanism comprising a lever and a thrust member having a pivoted head coöperating with the lever, means to retract the anvil from the feed mechanism, a plunger to receive a fastener part from another feed mechanism, and means for moving the plunger into coöperation with the anvil to assemble the parts of the fastener.

9. In a machine of the character described, in combination, an anvil and a plunger to coöperate therewith, a trip mechanism for operating one of said elements, said mechanism comprising a lever and a thrust member coöperating with said lever, the thrust member having a pivoted end portion, a spring to throw the pivoted end portion into engagement with the lever, and one of said parts having means to throw the pivoted end portion out of engagement with the lever upon the lever and said pivoted end portion taking a determined relation.

In testimony whereof I have hereunto signed my name in the presence of two subscribing witnesses.

CHAS. H. PULLON.

Witnesses:
ANNA S. CHOTZIANOFF,
ARTHUR F. ELLS.

---

Copies of this patent may be obtained for five cents each, by addressing the "Commissioner of Patents, Washington, D. C."